Aug. 1, 1967  H. H. PITCHER  3,333,501

OFFSET ADAPTER WASHER FOR CONDUIT NIPPLE ALIGNMENT

Filed Sept. 3, 1965

INVENTOR.
HAROLD H. PITCHER
BY *Eckhoff and Slick*

ATTORNEYS

United States Patent Office 3,333,501
Patented Aug. 1, 1967

3,333,501
OFFSET ADAPTER WASHER FOR CONDUIT
NIPPLE ALIGNMENT
Harold H. Pitcher, 3005 Friendly St.,
Eugene, Oreg. 97405
Filed Sept. 3, 1965, Ser. No. 484,902
1 Claim. (Cl. 85—50)

This invention relates to a structure for electrical conduits and similar piping, and more particularly relates to an improved washer structure which enables one to make connections between metal walled structures having holes therein wherein the holes are not in alignment.

In many electrical constructions wherein wires are drawn from one metal box to another such as in wiring switches, starters and the like, it is necessary to run the wires from one metal box to another in a rigid conduit to contain the electrical wiring. Such boxes are ordinarily provided with "knockouts" which consist of one or more scored or weakened circles in the metal wall so that a circle of metal can be knocked out, leaving a neat hole for the connection of the conduit or the like. A difficulty frequently arises when running wires from one box to a nearby box since the holes in one box may not be in exact alignment with the holes of the companion box. If the holes are not in alignment, a straight nipple cannot ordinarily be used, and it is necessary to employ a special offset nipple. Since the amount of offset varies from case to case, it is necessary to provide a large number of nipples having different degrees of offset in order to meet the varying situations which are encountered.

In accordance with the present invention, a simple washer having an offset hole is employed so that it is not necessary to use an offset nipple. Instead, a small supply of washers, having varying degrees of offset, serve to replace a large number of nipples which would ordinarily have to be carried in stock.

In the drawings forming part of this application:

Figure 1:
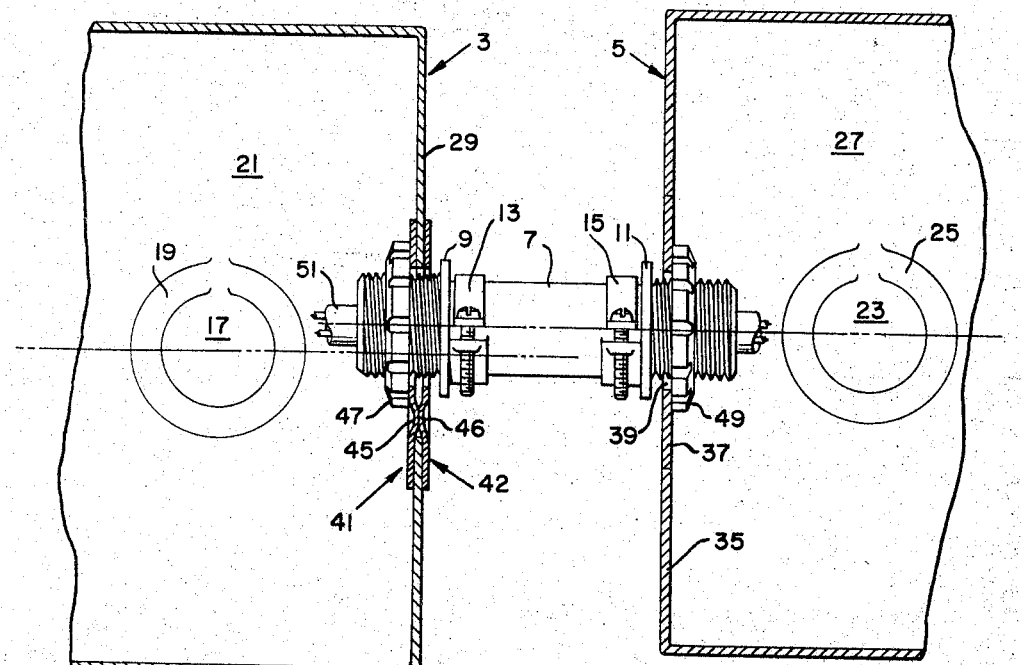
FIGURE 1 is a view, partially in section, of two boxes which have been connected by a conduit employing the washer of the present invention.
Figure 3:
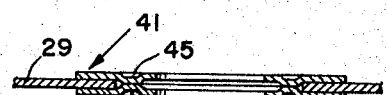
FIGURE 3 is a section on the line 3—3 of FIGURE 2.

Referring now to the drawings by reference characters, there is shown in FIGURE 1 a first outlet box 3 and a second outlet box 5 having a short nipple 7 connecting the two boxes. Nipple 7 is provided with threaded connectors 9 and 11 at each end thereof, suitably secured by clamps 13 and 15. The boxes are provided with knockouts in two of the walls; thus, box 3 is provided with concentric knockouts 17 and 19 in wall 21, while box 5 is similarly provided with knockouts 23 and 25 in wall 27. In addition, wall 29 of box 3 is provided with the knockouts 31 and 33, while wall 35 of box 5 is provided with a large knockout 37, and in addition, as is shown in FIGURE 1, an opening 39 has been made in the wall 35 by taking the knockout out which is concentric with knockout 37. However, as can best be seen in FIGURE 1, the holes in the boxes 3 and 5 are not in alignment so that if one merely took out a knockout of a suitable size in each of the boxes, the holes would not be in alignment, and it would be necessary to employ a nipple of offset configuration.

In accordance with the present invention, this difficulty is solved by providing a novel washer which has been generally designated 41, which preferably has a circular configuration, and which has an offset hole 43 therein. In addition, the washer has a ridge 45 which corresponds to more than one-half of a circle, the size of the circle being greater than the size of the hole 43. Ordinarily, the size of the circle formed by a continuation of the ridge 45 would correspond with a knockout two sizes larger than the hole 43, e.g. for a hole ½ inch in diameter the ridge would correspond with a hole 1 inch in diameter. Since the washers are employed in pairs, the height of the ridge 45 is slightly less than one-half the wall thickness 29.

Figure 2:
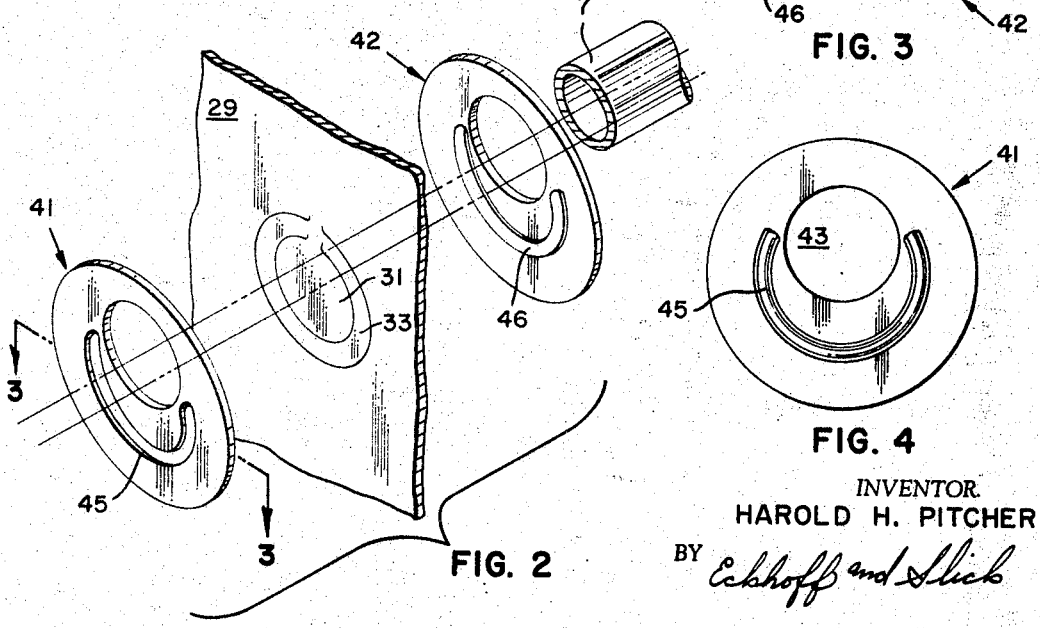
FIGURE 2 is an exploded perspective view showing the method of employing the washer of the present invention.
Figure 4:
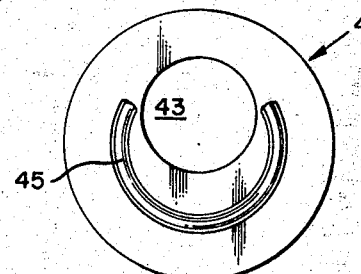
FIGURE 4 is a side view of a washer embodying the present invention.

Referring now particularly to FIGURE 2, it will be seen that the conduit 7 would fit in the hole if the knockout 31 were removed, but if this were done, a straight path would not be provided with corresponding holes in the box 5. Thus, instead of just removing the knockout 31, one removes the knockout 33 which enables the ridges 45 and 46 of the washers 41 and 42 to engage the sides of the hole and to be retained thereby. The washers 41 and 42 can now be rotated together to bring the hole 43 into alignment with the corresponding hole in the box 5. Nuts 47 and 49 can now be used to secure the connectors 9 and 11, forming a sturdy structure, and suitable wiring as at 51 can now be drawn through the conduit from one box to the other.

In the illustration given above, only one pair of washers has been shown in connecting the two boxes, but it is obvious that in many instances a better fit can be secured by using offset washers in each of the boxes, particularly if the degree of misalignment is great. It will be obvious that the washers can be made with varying degrees of eccentricity to permit handling different degrees of misalignment. However, as a practical matter, relatively few washers suffice for all needs, particularly if one uses offset washers in each of the two boxes which are connected.

Although the washer has been described as having a ridge 45, it is obvious that a continuous ridge need not be employed, it only being necessary to employ some locating element to keep the washer engaged in the hole. Thus, a series of dimples might be employed rather than the continuous ridge shown. Preferably the circle described by a continuation of ridge 45 will be concentric with the outer diameter of the washer, although this condition is not essential for the operation of the device. Further, although it is conventional to make such washers of circular outer configuration, this is likewise not necessary for proper operation.

It is believed obvious from the foregoing that I have provided a simple, yet effective, washer which enables one to connect misaligned holes utilizing a straight nipple.

I claim:

A washer comprising a substantially flat sheet of a solid material, a round hole in said washer of a diameter to fit a conduit nipple, and a raised portion defining an arcuate ridge projecting from one side of said flat surface, said ridge being spaced from and partially surrounding the hole, said ridge having outer dimensions conforming to a portion of a circle, said portion exceeding a semi-circle but being less than a complete circle and having a greater diameter than the hole, the portion of a circle defined by said ridge and said round hole having centers offset relative to each other with the hole being eccentrically located in said washer, whereby an imaginary continuation of said ridge intersects said hole.

References Cited

UNITED STATES PATENTS

| | | | |
|---|---|---|---|
| 1,272,714 | 7/1918 | Reinhalter | 287—136 |
| 2,730,381 | 1/1956 | Curtiss | 85—50 |
| 3,006,443 | 10/1961 | Siler | 285—178 |
| 3,236,277 | 2/1966 | Jones et al. | 151—38 |

CARL W. TOMLIN, *Primary Examiner.*

R. S. BRITTS, *Assistant Examiner.*